United States Patent [19]

Uchida

[11] Patent Number: 4,581,954
[45] Date of Patent: Apr. 15, 1986

[54] STEERING WHEEL COVER ASSEMBLY
[75] Inventor: Sadao Uchida, Aichi, Japan
[73] Assignee: Toyoda Gosei Co., Ltd., Aichi, Japan
[21] Appl. No.: 623,898
[22] Filed: Jun. 25, 1984
[30] Foreign Application Priority Data Jun. 24, 1983 [JP] Japan .................................. 58-98357

[51] Int. Cl.⁴ ................................................ B62D 1/06
[52] U.S. Cl. ........................................ 74/552; 74/558; 74/558.5; 138/156; 138/168; 403/344
[58] Field of Search ...................... 74/558, 558.5, 552; 174/136; 150/52 M, 52 R; 403/344; 138/162, 166, 168, 167, 163; 273/75 R, 73 J

[56] References Cited

U.S. PATENT DOCUMENTS

| Re. 24,613 | 3/1959 | Hageltorn | 138/156 X |
|---|---|---|---|
| 2,121,963 | 6/1938 | Goit | 74/558 |
| 2,212,169 | 8/1940 | Rendle | 74/558 X |
| 2,227,579 | 1/1941 | Harley | 74/558 |
| 2,491,803 | 12/1949 | Heras et al. | 74/558 |
| 2,618,987 | 11/1952 | Goldstine | 74/558 |
| 2,825,673 | 3/1958 | Tschappu | 138/168 |
| 3,088,619 | 5/1963 | Boucher | 150/52 R |
| 3,802,291 | 4/1974 | Young | 74/558 |
| 3,858,282 | 1/1975 | Plummer | 138/168 X |
| 4,373,718 | 2/1983 | Schmidt | 74/558.5 X |

Primary Examiner—Kenneth J. Dorner
Assistant Examiner—Rodney M. Lindsey
Attorney, Agent, or Firm—Cushman, Darby & Cushman

[57] ABSTRACT

A covering assembly for the ring portion of a steering wheel which comprises a cover layer, a hooking member and a hooked member. The hooking and hooked members are fixed along opposing longitudinal sides of the cover layer and will fit together in a locking relationship with the cover stretched about the ring portion. The steering wheel is provided with a circumferential groove in which the hooked member is inserted and the hooking member is received by the hooking member after the cover material is wrapped and stretched around the steering wheel so that the cover fits tightly thereabout.

9 Claims, 6 Drawing Figures

STEERING WHEEL COVER ASSEMBLY

FIELD OF THE INVENTION

This invention concerns an assembly for covering steering wheels for automobiles or the like.

BACKGROUND OF THE INVENTION

It is often desirable to cover a steering wheel with leather or some other material to provide an attractive appearance, absorb sweat and provide a soft and smooth touch.

Conventionally, as shown in FIG. 1, the outer ring portion 1 of a steering wheel for virtually any type of vehicle can be covered with a belt-shaped piece of leather 3. A cushion layer 2 can be used and interposed between the leather and the wheel with the combination of the leather and cushion member being pulled around the wheel and hand sewn in place using thread 4. Application of such a hand-made steering wheel cover, however, is both time consuming and, therefore, expensive. Further, it is usually impossible to sew the belt-shaped leather 3 to the steering wheel with a machine in an attempt to reduce the cost. This is because the plastic ring portion 1 of the steering wheel is an obstacle in any such sewing operation.

Therefore, it is desirable to cover a steering wheel with a leather cover in a quick and easy manner.

Accordingly, one object of the present invention is to provide an assembly that permits a steering wheel to be quickly and easily covered.

Another object of the present invention is to provide a steering wheel which has a cover providing a soft and smooth touch.

SUMMARY OF THE INVENTION

The steering wheel for a vehicle of the present invention has a rim, a spoke and a boss. The rim itself is comprised of a ring portion that is gripped during use and the novel cover assembly.

The ring portion is provided with a ring groove formed circumferentially thereabout. The cover assembly includes a cover layer, a hooking belt or member and a hooked belt or member. The hooking and hooked members are fixed to and extend along opposite longitudinal sides of the cover layer and will provide the means for securing the cover assembly in place. The hooked belt is inserted in the ring groove, the covering layer is wrapped about the ring portion, and the hooked belt is meshed with or received within the hooking belt, this inner connecting of those two members occurring about the circumference of the ring portion so that the cover layer covers the ring portion tightly and the two members are secured together.

Other objects, features and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EXEMPLARY EMBODIMENTS OF THE PRESENT INVENTION

Figure 1:
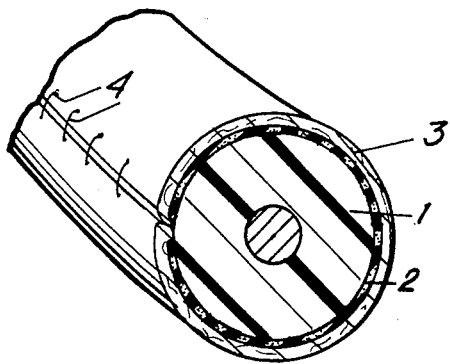
FIG. 1 is a partial diagrammatic perspective view showing the cross sectional structure of a ring portion of a conventional steering wheel.
Figure 3:
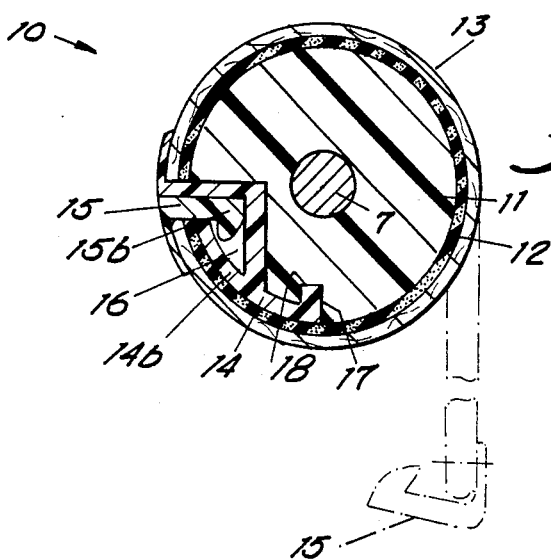
FIG. 3 is a cross sectional view of a first embodiment of a steering wheel covering assembly, in position on a steering wheel ring portion, according to the present invention.
Figure 4:
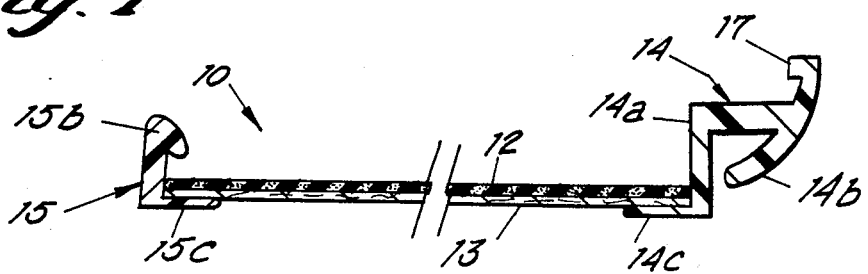
FIG. 4 is a diagrammatic cross sectional view of the covering assembly shown in FIG. 3 in open position.
Figure 2:
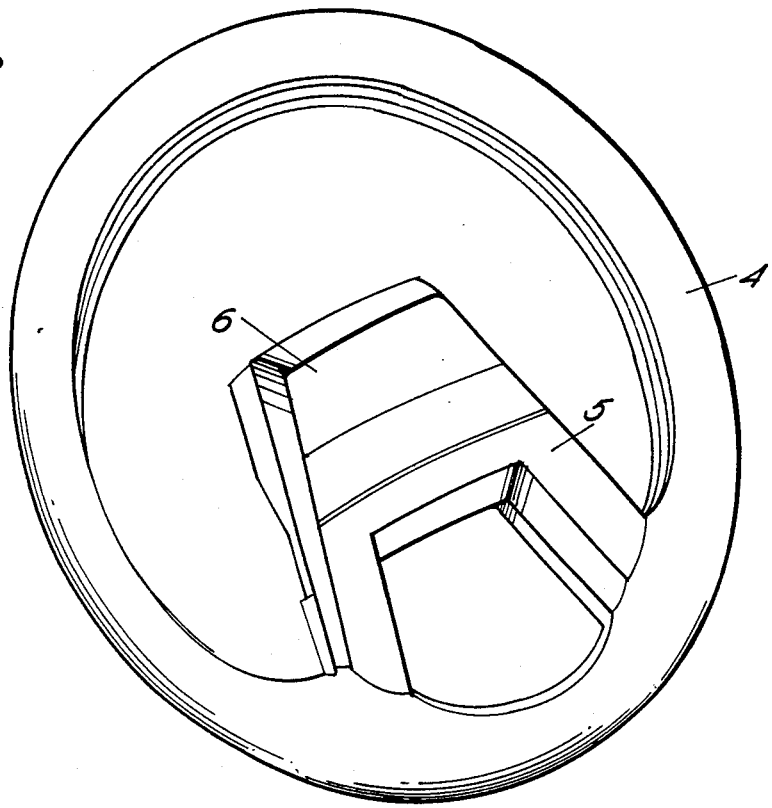
FIG. 2 shows a covered steering wheel according to the present invention.

A known prior art construction technique for wheel covers is shown in FIG. 1 and was described above. Turning now to FIGS. 2, 3 and 4 a first embodiment of the present invention is illustrated.

The steering wheel shown in FIG. 2 is comprised of a rim 4, spokes 5 and a boss 6. Rim 4 comprises a plastic ring portion 11, shown in FIG. 3, that overlies a metallic core 7. The cover assembly is generally indicated at 10. Plastic portion or layer 11 is preferably made of hard plastic such as polypropylene, hard polyvinylchloride, polyvinylacetal and acrylonitrilebutadiene-styrene copolymer or soft plastic such as soft polyvinylchloride, polyvinylchloride foam and polyurethane foam. However, other materials could also be used.

Cover assembly 10 is shown as being comprised of two layers, namely a cushion layer 12 and a belt-shaped outer piece of material 13. This outer layer is preferably leather but other materials could also be used. Cushion layer 12 is made of a plastic or rubber foam material, about 1-3 mm thick, is preferably bonded or otherwise attached to the outer cover material. Cushion layer 12 can be eliminated from the cover assembly 10, but when used a soft and smooth feeling is developed. The belt-shaped cover material 13 is made of natural or synthetic materials, as well as natural and synthetic forms of leather.

A hooking belt member 15 and a hooked belt member 14 are fixed along the opposing longitudinal sides or edges of the cover assembly 10. The hooked belt 14 comprises an arm 14a having a substantially "L" shaped cross section, an attaching plate 14c which extends from one end of arm 14a at a right angle, and a curved arm 14b which extends across the other end of arm 14a. One end of curved arm 14b lies adjacent but spaced from the other part of the L-shaped member from the one to which it is connected, and defines a receiving area therebetween. The opposite end of curved arm 14b, which extends outwardly past the juncture point with the other end of arm 14a, includes a projection 17. Thus, the two ends of curved arm 14b extend in opposite directions from the other end of arm 14a and together have roughly a T shaped cross section. Hooked belt 14 is integrally molded by an extrusion molding process wherein thermoplastic resins are used.

The hooking belt 15 comprises a hook portion 15b and an integrally formed attaching plate 15c. The attaching plate 15c is extended from one end of the hook portion 15b and at a right angle thereto. Hooking portion 15 is also molded by an extrusion molding process in the same way when the hooked belt is molded.

Attaching plates 14c, 15c of the hooked belt 14 and hooking belt 15, respectively, are sewn along the longitudinal each side of the cover assembly 10 although other forms of attachment, such as adhesive, could also be employed it only being essential that a secure joint be achieved.

It is desirable to use softer thermoplastic resins for the hooked belt 14 and the hooking belt 15 to prevent attaching plates 14c, 15c from cracking when sewn or otherwise attached to the cover assembly 10.

Some portions of the hooked belt 14 and the hooking belt 15 are suitably cut off where these portions touch spokes 4 of the steering wheel in order to assure a proper fit.

The cover assembly 10 with hooked belt 14 and hooking belt 15 is attached about ring portion 11 in the following manner as shown in FIG. 3.

First, projection 17 of the hooked belt 14 is set in a hooked groove 18 formed circumferentially about ring portion 11. A ring groove 16 is also formed circumferentially about ring portion 11 so that the hooked belt 14 can be inserted into the ring groove 16. After projection 17 is set in place and the hooked belt is inserted in ring groove 16, the remaining portion of cover assembly 10 is wound around ring portion 11 so that the cover material is stretched.

Finally, hooking belt 15, fixed along the opposite longitudinal edge or side of the covering material is inserted in the receiving area between the adjacent ends of arms 14a and 14b so that hook portion 15b is retained as shown in FIG. 3. With the projection 17 set in hooked groove 18 at this time, winding proceeds easily and the cover assembly 10 remains tightly hooked in place during the covering process.

Figure 5:
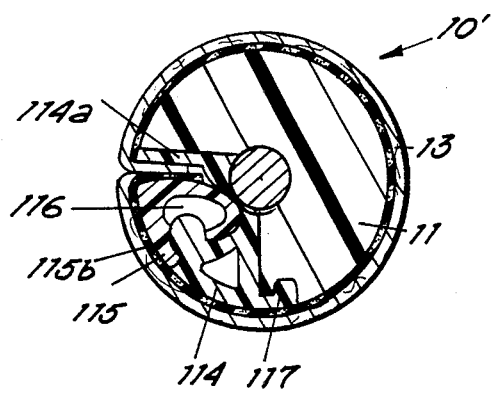
FIG. 5 is a diagrammatic cross sectional view of a second embodiment of a steering wheel covering assembly in position on a steering wheel ring portion.

FIG. 5 illustrates a second embodiment of the present invention including a hooked belt 114 and a hooking belt 115. An arm 114a of the hooked belt 114 and a hook portion 115b of the hooking belt 115 are fixed to the cover material so that the hooked belt 114 and the hooking belt 115 are themselves covered by the cover material 10 when the hooked belt 114 and hooking belt 115 are inserted in a ring groove 16.

Figure 6:
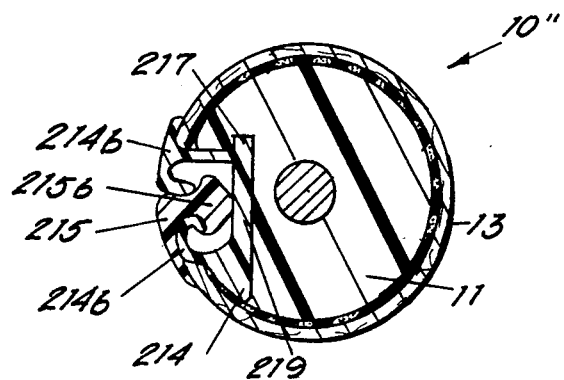
FIG. 6 is a diagrammatic cross sectional view of a third embodiment of a steering wheel covering assembly in position on a steering wheel ring portion of this invention.

FIG. 6 illustrates a third embodiment of the present invention which also includes a hooking portion 215 and a hooked portion 214. The hooked portion 214 includes a projection 217 formed on an end of a base portion 219 with the receiving area being defined between two opposing, flexible and spaced apart lips 214b, 214b.

A hook portion 215b, formed with a sectional spade shape, will be inserted into the receiving area between the two receiving lips or flaps 214b, 214b when the cover assembly 10" is secured in place.

As described above, since the cover assembly is assembled by fitting the hooking portion into the hooked portion sewing is not needed, and the wheel will be covered in less time and look better.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A steering wheel for a vehicle having a rim, a spoke and a boss wherein said rim comprises a ring portion having means defining a ring groove extending circumferentially therearound said groove means including means defining a second circumferentially extending groove, said steering wheel including a cover assembly having a cover layer with two parallel longitudinal edges, hooking means attached along one longitudinal edge of said cover layer for hooking that longitudinal side of said cover layer in place within said cover assembly about said rim, and hooked means, attached along the opposite longitudinal edge of said cover layer, for fitting within at least a portion of said ring groove means to secure said opposite longitudinal edge in place about said steering wheel as the cover assembly is installed about the rim and for being hooked by said hooking means to complete installation of said cover assembly about said steering wheel, said hooked means further including means defining a projection member for engaging said second circumferential groove when said hooked means is positioned within said ring groove means.

2. A steering wheel for a vehicle having a rim, a spoke and a boss wherein said rim comprises a ring portion having defining a shaped ring groove formed circumferentially about said ring portion;

a cover portion having a cover layer, a hooking belt and a hooked belt wherein said hooking belt and said hooked belt are fixed on opposing longitudinal sides of said cover layer respectively, said hooked belt having a first portion for being inserted into and engaging said ring groove means and a second curved portion attached to said first portion conforming to the curvature of said rim and lying beneath said cover layer, said first and second portions defining therebetween means to be hooked by said hooking belt so that said cover layer covers said ring portion and is fixed thereon.

3. A steering wheel according to claim 1, wherein said cover layer is a laminate of a leather layer and cushion layer.

4. A steering wheel according to claim 2, wherein said cover layer is a laminate of a leather layer and cushion layer.

5. A steering wheel according to claim 3, wherein said cushion layer is 1-3 mm thick.

6. A steering wheel according to claim 4, wherein said cushion layer is 1-3 mm thick.

7. A steering wheel according to claim 2, wherein said hooking belt and said hooked belt have attaching plates, respectively, which are fixed to said opposing longitudinal sides of said cover layer.

8. A steering wheel for a vehicle having a rim, a spoke and a boss wherein said rim comprises a ring portion having means defining a ring groove formed circumferentially about said ring portion;

a cover portion having a cover layer, a hooking belt and a hooked belt wherein said hooking belt and said hooked belt are fixed on opposing longitudinal sides of said cover layer respectively, said hooked belt being inserted in said ring groove means and is hooked by said hooking belt so that said cover layer covers said ring portion and is fixed thereon wherein said hooked belt is comprised of an arm having two ends and a shape corresponding to said ring groove means, a curved arm attached to one end of said arm so as to extend thereabout in opposite directions, said curved arm having two ends with a projection at one end, said hooked belt having a receiving portion defined between the other end of said curved arm and said arm, said hooked belt also including an attaching plate which is extended from the other end of said arm, said hooking belt having a hook portion and an attaching plate which is extended from an end of said hook portion.

9. A steering wheel according to claim 2, wherein said hooking belt has a hook portion having spade shaped cross section and said hooked belt has a base portion from which two curved receiving members extend and define a receiving area therebetween into which said hook portion can be inserted.

* * * * *